United States Patent Office 3,450,510
Patented June 17, 1969

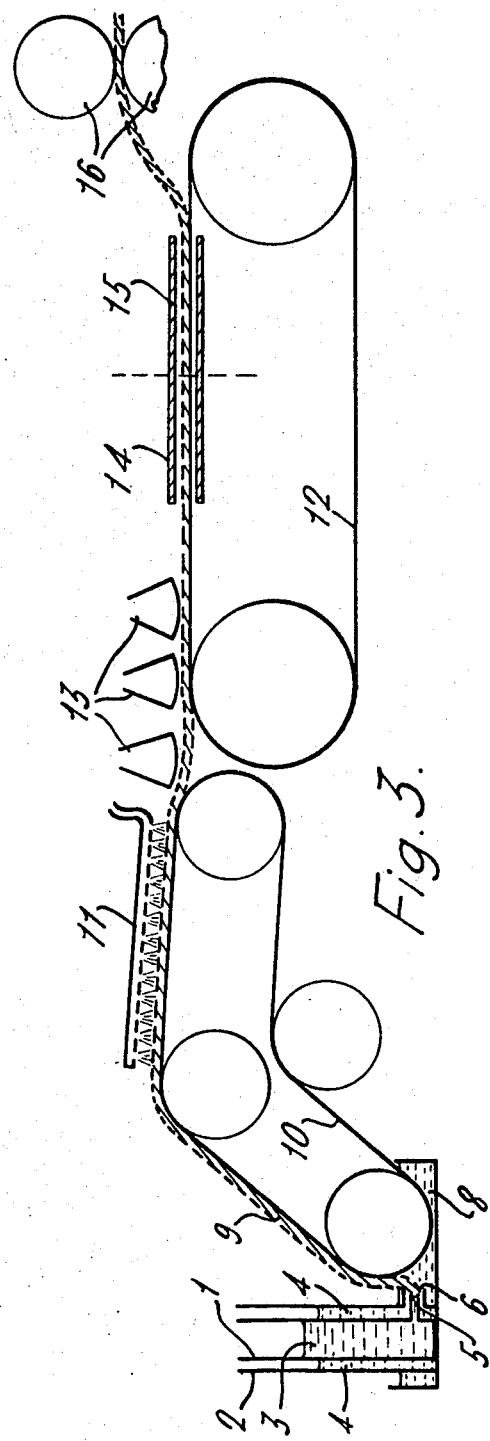
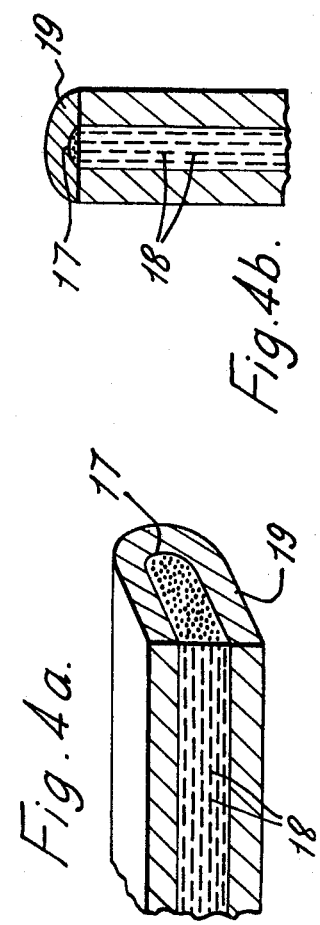

3,450,510
PROCESSES FOR PRODUCING FIBRE-REINFORCED MATERIALS
Clifford Aubrey Calow, Reading, England, assignor to United Kingdom Atomic Energy Authority, London, England
Filed Apr. 13, 1967, Ser. No. 630,638
Claims priority, application Great Britain, Apr. 14, 1966, 16,341/66
Int. Cl. B21c 23/24; B22f 3/20
U.S. Cl. 29—182.2      4 Claims

ABSTRACT OF THE DISCLOSURE

Fibre-reinforced metallic material is produced by dispersing metallic or refractory fibres with metal powder in a plastic medium e.g. an alginate solution to form a first plastic mix, dispersing further metal powder in a plastic medium e.g. an alginate solution to form a second plastic mix, extruding the first mix to align the fibers in the direction of extrusion and simultaneously extruding the second mix so that the surface of the extruded first mix is sheathed with the extruded second mix to form a coating in intimate contact therewith, thereby forming a composite extrusion, treating the composite extrusion to solidify the plastic media e.g. by gelling with a mineral acid followed by heating the composite extrusion to remove the solidified plastic media and to loose-sinter the metal powder of the extruded second mix.

Background of the invention

This invention relates to processes for producing fibre-reinforced materials.

In the specification of copending U.K. application No. 40,082/64 there is described a method for producing fibre-reinforced metallic material in which fibres of metallic or refractory origin are brought into alignment in a specific direction in a metallic matrix. The fibres and metallic powder are mixed with a liquid plastic medium and the mix extruded through a suitable orifice to produce a viscous extrusion in which the fibres are aligned in the direction of extrusion. The extruded material is treated to convert the plastic medium into a solid flexible tape or thread carrying the fibres aligned in the direction of flow and admixed with the metallic powder, followed by further processing treatment e.g. controlled drying, to develop tape or thread having measurable "green" strength suitable for intermediate handling operations. The tape or thread may then be formed into shaped assemblies formed from windings etc. of the tape or thread, the plastic medium being removed by ignition and the fibre-reinforced metal shape heat-treated, preferably hot-pressed, to consolidate the structure by sintering the powder and thereby develop high strength.

In the "green" condition, the strength of the material, and hence its ease of handling, is dependent on the properties of the plastic medium after its conversion to the solid flexible state. Difficulty may be experienced in ensuring that these properties are suitable. For example when using ammonium alginate as the plastic medium, as described in the aforementioned specification, it has been found that the development of optimum "green" strength in the solidified flexible tape or thread extrusions formed by treating the extruded alginate mix with acid to gel the alginate and thereafter drying, depends rather critically on the degree of drying to which the gelled extrusion is subjected and to the subsequent ambient conditions during storage. To produce a tape or thread having sufficient "green" strength for handling during further processing, both the time and the temperature of the drying treatment, and the subsequent storage conditions, must be closely controlled, otherwise an inherently brittle product may result.

It is an object of the present invention to provide a process for producing a non-brittle produce of adequate strength for subsequent handling and processing which does not depend on the physical characteristics of the solidified plastic medium.

Summary of the invention

According to the present invention a process for producing fibre-reinforced metallic material comprises dispersing metallic or refractory fibres with metal powder in a plastic medium to form a first plastic mix, dispersing metal powder in a plastic medium to form a second plastic mix, extruding the first mix in a manner to align the fibres in the direction of extrusion, simultaneously extruding said second mix to sheath the surface of the extruded first mix with a coating in intimate contact therewith to form a composite extrusion, solidifying the plastic media of the composite extrusion, and heating said composite extrusion to remove the solidified plastic media and to loose-sinter the metal powder of the extruded second mix.

The plastic media may be solutions of an alginate and the composite extrusion solidified by gelling with a mineral acid prior to said heating. Preferably the composite extrusion is dried after gelling prior to said heating.

The present invention also provides a fibre-reinforced metallic material produced by a process as aforesaid.

After loose-sintering, the composite extrusion is readily handled and may be finally processed by hot pressing, e.g. hot rolling, to produce the required fibre-reinforced metallic material.

The present invention is based on the discovery that when an extruded mixture of metallic powder and plastic medium is solidified and then heated to drive off the plastic material, the metallic powder can thereby be sufficiently loose-sintered to produce a product which is strong enough to handle. If, however, the same treatment is applied to an extruded mixture containing in addition aligned fibres, insufficient loose-sintering occurs and a brittle product results. It is postulated that this inadequate sintering is due to the springy nature of the fibres serving to keep the metal particles apart when the product shrinks on firing.

In the composite product provided by the present invention the handling strength prior to final processing is provided by the loose-sintered powder in the fibre-free sheath of the composite product, which also serves to protect the more brittle fibre-bearing portion. The handling strength is thus independent of the characteristics of the plastic medium, which is driven off.

Brief description of the drawings

To enable the nature of the present invention to be more readily understood, attention is directed, by way of example, to the accompanying drawings, wherein

FIGURE 3 is a schematic illustration of an apparatus for performing successive stages of the present process.

FIGURES 4(a) and (b) show sectional views of typical composite products produced by the present process.

Description of the preferred embodiment

Figure 1:
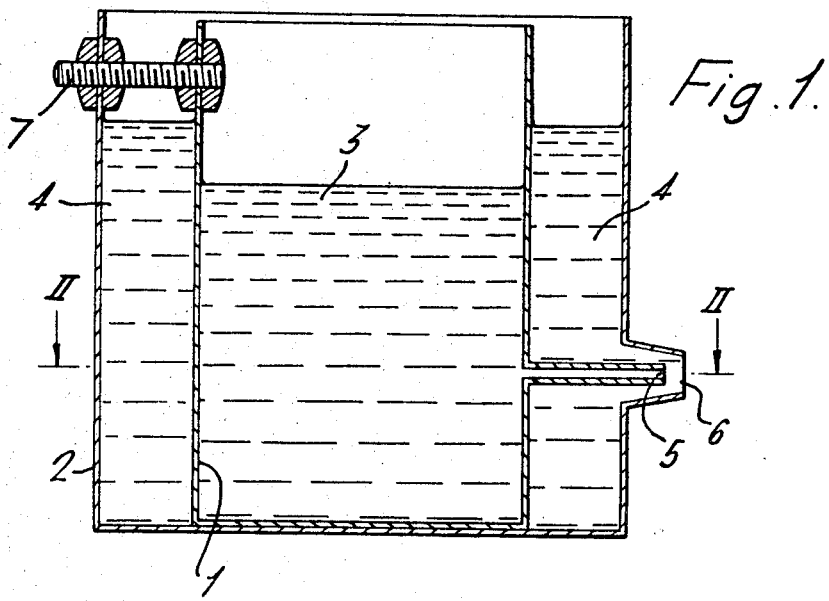
FIGURE 1 is a sectional elevation of an extrusion apparatus suitable for use in the present process.
Figure 2:
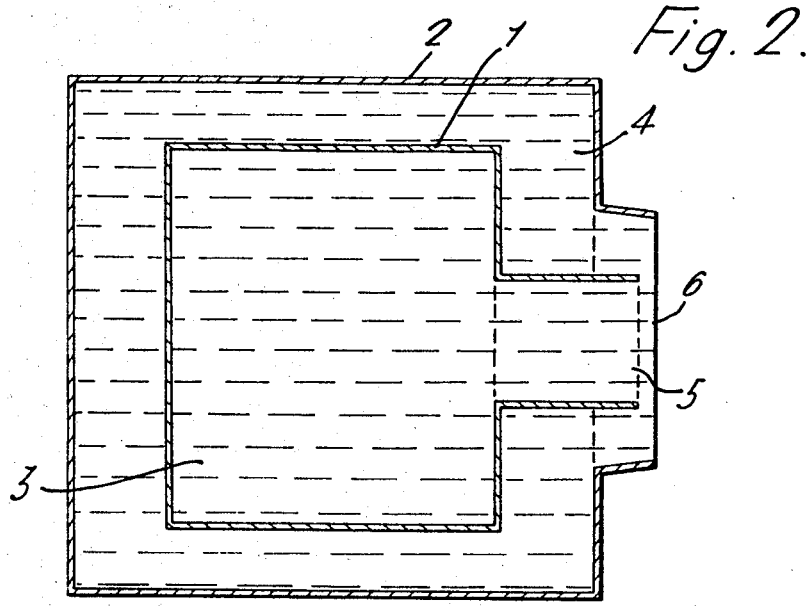
FIGURE 2 is a plan view of a cross-section at the line II—II of FIGURE 1.

FIGURES 1 and 2 illustrate an inner vessel 1 within an outer vessel 2, vessel 1 containing a metal powder-fibre-plasticizer mix 3, and vessel 2 containing a metal powder-plasticizer mix 4. Vessel 1 has an extrusion orifice 5 in the form of a narrow slit and vessel 2 has an extrusion orifice 6 rectangular in cross-section. Orifice 5 is located within orifice 6 and their relative axial positions can be varied by moving inner vessel 1 with respect to the outer vessel 2, by screw means 7; by tapering the orifice 6 in the extrusion direction, as shown, variation in the relative positions of the two orifices allows the thickness of the outer extrusion (of mix 4) to be varied. To ensure uniformity of cross-section of the composite extrusion it is preferred to apply a positive pressure, in the form of a few inches water gauge, to mix 3 to overcome any tendency for the viscous flow through the outer orifice 6 to arrest the viscous flow through the inner orifice 5. The composite extrusion from the orifices shown in FIGURES 1 and 2 is a flat tape consisting of mix 3 completely sheathed in mix 4.

In FIGURE 3 solidification of the plastic medium is achieved by passing the composite extrusion into a bath 8 of a mineral acid where the medium, e.g. ammonium alginate or a cellulose derivative, is converted to a gel. The solidified, flexible tape 9 is conveyed by a moving belt 10 to a washer 11, and the wet tape then transferred to a heat-resisting belt 12 e.g. of Refrasil (registered trademark). The tape is partially dried by infra-red heaters 13 before being fully dried in an electric resistor-wound tube furnace 14 and fully fired and sintered in a further electric resistor-wound furnace 15, the two furnaces being continuous with each other. Finally the loose-sintered tape is hot rolled at 16 and wound onto a collecting drum (not shown).

In an example of the invention silicon nitride fibres of length 1 mm. and diameter 2 microns were dispersed in a 2% by wt. ammonium alginate aqueous solution, the fibres forming 0.5 vol. perecnt of the alginate solution. 10 wt. percent of silver powder of particle size less than 1 micron was added and the mix stirred at high speed to disperse the silver and the silicon nitride. The mix (mix 3) was degassed at 70° C. under vacuum and poured into vessel 1 having a narrow orifice 5 of dimensions 1½" x ⅟₁₆". Simultaneously a second mix (mix 4) of similar composition, excepting that the fibres were excluded, was prepared, stirred, degassed and poured into vessel 2, having an orifice 6 of dimensions 1¾" x ¼" tapering to 1¾" x ⅛" in cross-section.

1"–2" water gauge pressure was maintained over the mix in vessel 1 and the composite extrusion issued into a bath 8 of dilute hydrochloric acid of pH 1 where it gelled to form the solid tape 9. This composite extrusion was liberally washed by sprinkler 11 to remove adherent acid and then transferred onto the belt 12 for partial drying by the infrared heaters 13, followed by finish drying and partial ignition of the alginate at 500° C. in the first furnace 14 and firing with loose-sintering at 800–900° C. in the second furnace 15. The loose-sintered tape was then hot rolled at 16 and wound onto a collecting drum. The speed of belt 12 was adjusted to allow tape to pass through furnace 15 in about 2 minutes with a residence time of about 40 seconds in the firing zone.

FIGURE 4 shows sectional views of composite extrusions obtainable with the present invention. FIGURE 4(a) illustrates a section of a composite tape obtained with extrusion apparatus of the "double-slit" type shown in FIGURES 1 and 2. FIGURE 4(b) shows the composite thread obtained when the "double-slit" is replaced by a "double-hole" of concentric orifices. In both figures the core 17 consists of aligned fibres 18 in a matrix of unsintered metallic powder, protected by a sheath 19 of loose-sintered powder which gives strength to the composite product.

Figure 5A:
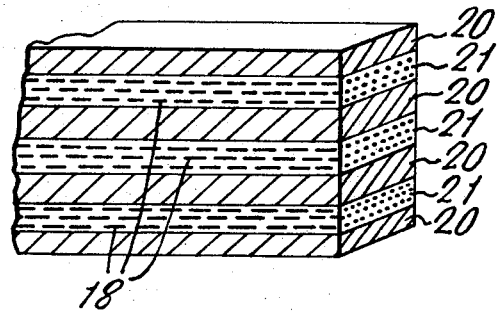
FIGURES 5(a), (b) and (c) show sectional views of typical assemblies formed from products produced by the present process.
Figure 5B:
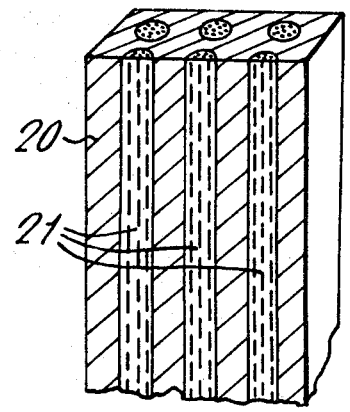
Figure 5C:
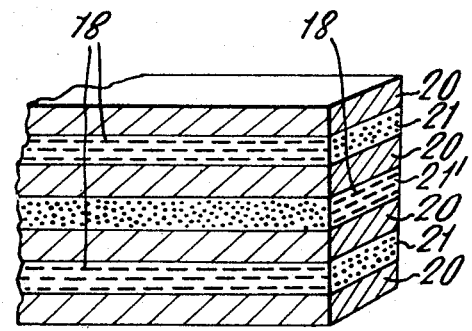

FIGURES 5(a) and 5(b) show sections of assemblies formed by hot-pressing together several loose-sintered tapes or threads of the kind shown in FIGURES 4(a) and 4(b) respectively. The portions 20 consist of pure sintered metal, and the portions 21 of aligned fibres in a sintered metal matrix. In FIGURE 5(c) the successive fibre-bearing layers 21 have their fibres aligned mutually at right angles to give strength in two directions at right angles. The layer 21', having its fibres aligned at right angles to the length of the tape assembly, is obtained by cutting off short lengths of loose-sintered tape having their fibres aligned as in FIGURE 4 and turning these lengths through 90° before hot pressing the several tapes together.

The outer sheath of pure metal e.g. copper or silver, can be dissimilar to the central fibre-reinforced metal, depending on the required properties of the composite. An advantage of the invention is that variation of the thickness and shape of the outer pure metal allows the overall metal concentration in a structure to be varied over wide limits: this, inter alia, enables differing degrees of ductility to be provided in the composite structure.

Fibres other than silicon nitride can be used in the present invention, e.g. silica or alumina fibres. Instead of silver, the metal powder may consist, for example, of nickel, iron, copper, nimonics and other alloy powders.

Suitable plastic media are those that solidify:
 (i) By gelling, e.g. alignates or cellulose derivatives,
 (ii) By cooling, e.g. thermal-softening plastics such as methylmethacrylate, and
 (iii) By heating and curing, e.g. thermo-setting plastics such as epoxy resins.

What we claim is:
1. A process for producing fibre-reinforced metallic material comprises dispersing metallic or refractory fibres with metal powder in a plastic medium to form a first plastic mix, dispersing metal powder in a plastic medium to form a second plastic mix, extruding the first mix in a manner to align the fibres in the direction of extrusion, simultaneously extruding said second mix to sheath the surface of the extruded first mix with a coating in intimate contact therewith to form a composite extrusion, solidifying the plastic media of the composite extrusion, and heating said composite extrusion to remove the solidified plastic media and to loose-sinter the metal powder of the extruded second mix.

2. A process as claimed in claim 1 wherein the plastic media are aqueous solutions of an alginate and the composite extrusion is solidified by gelling with a mineral acid prior to said heating.

3. A process as claimed in claim 2 wherein the composite extrusion is dried after gelling prior to said heating.

4. Fibre-reinforced metallic material including an inner portion comprising metallic or refractory fibers aligned in a matrix of substantially unsintered metallic powder and an outer portion comprising loose-sintered metallic powder forming a sheath in intimate contact with the surface of said inner portion.

References Cited

UNITED STATES PATENTS

| | | | |
|---|---|---|---|
| 3,142,560 | 7/1964 | Storchheim | 75—214 |
| 3,216,841 | 11/1965 | Thellmann | 106—209 |
| 2,972,221 | 2/1961 | Wilke et al. | 214—108 |

JULIUS FROME, *Primary Examiner.*

T. MORRIS, *Assistant Examiner.*

U.S. Cl. X.R.

264—108; 75—200, 208; 29—195; 117—71